United States Patent Office 3,002,967
Patented Oct. 3, 1961

3,002,967
PROCESS FOR PREPARING PHOSPHORIC ACID MONOESTERS OF MANNOSE POLYMERS
Morey E. Slodki, Peoria, Ill., assignor to the United States of America as represented by the Secretary of Agriculture
No Drawing. Filed Dec. 18, 1959, Ser. No. 860,615
2 Claims. (Cl. 260—234)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to novel phosphoric acid monoesters derived from the potassium salts of certain phosphomannan polymers, namely the phosphomannan polymers produced in the aerobic whole culture fermentations of *Hansenula holstii*, NRRL Y-2448, Y-2154, and Y-2155, as disclosed and claimed in Patent No. 2,961,378 of Benedict et al., and also the phosphoric acid monoesters derived from the potassium salts of the phosphomannan polymers produced in corresponding fermentations of *Hansenula capsulata*, NRRL Y-1889, *H. capsulata*, NRRL Y-1842, *H. hostii*, NRRL Y-2154, *H. minuta*, NRRL Y-411, *Pachysolen tannophilus*, NRRL, Y-2461, *Torulopsis pinus*, NRRL Y-2023, and *Saccharomyces pini*, NRRL YB-2022.

The phosphoric acid monoesters prepared from the potassium salts of the above polymers possess marked dispersant action so that, for example, a very small amount admixed with 100 gm. of zinc oxide in 100 ml. of water provides a smooth fluid dispersed paste instead of an extremely thick lumpy paste. Such free-flowing pastes can advantageously be employed in skin lotions and ointments. It is emphasized that the action of my monoesters is not a suspending action as would be provided by a gum-like polymer, and that aqueous solutions thereof are clear, water-white, and tasteless, the 1.0 percent aqueous solutions having a viscosity of about 1.5 centistokes at 25° C.

I have discovered that the potassium phosphomannans obtained by methanol precipitation from the said fermentations are converted to the pyrophosphoric acid form of the phosphomannan by slurrying with the hydrogen form of a sulfonic acid type cation exchange resin. The viscosity of the somewhat viscous solution falls abruptly and the pyrophosphoric acid form of the polymer can simply be decanted off, leaving the cation exchange resin. Moderate heating of the decanted pyrophosphoric acid form causes an autohydrolysis and the formation of the phosphoric acid form without significant concomitant hydrolysis of the mannose polymer chains.

The complete structures of the autohydrolyzed phosphomannan polymers of this invention have not yet been fully established, but since over 95 percent of the phosphorus content has been isolated in the form of mannose-6-phosphoric acid as shown in my concurrently filed application, Serial No. 860,614, the phosphoric acid moiety is bound to the No. 6 carbon atoms of the mannosidic units.

Table I shows the degrees of polymerization and indicates the extent of phosphorylation of the potassium phosphomannan starting materials. It permits selection of the most advantageous member for a given purpose.

TABLE I
*Yeast phosphomannans*

| Organism | NRRL No. | Molar ratio of mannose to phosphorus | D.P. |
|---|---|---|---|
| *Hansenula capsulata* | Y-1889 | 2.5 | 101 |
| Do | Y-1842 | 2.5 | 244 |
| *Pachysolen tannophilus* | Y-2461 | 4.2 | 256 |
| *H. holstii* | Y-2154 | 5.2 | 600 |
| Do | Y-2448 | 5.7 | 588 |
| *Torulopsis pinus* | Y-2033 | 8.4 | 51 |
| *Sac. pini* | YB-2022 | 12.2 | 51 |
| *H. minuta* | Y-411 | 27.5 | 144 |

Table II shows the dispersant effect on zinc oxide of adding 1 percent (based on the zinc oxide) of neutralized autohydrolyzed Y-1842 and Y-2448 phosphomannan.

The following mixtures were prepared:
A. 30 gm. ZnO powder+30 ml. HOH.
B. 30 gm. ZnO powder+30 ml. HOH+1% NaCl
C. 30 gm. ZnO powder+30 ml. 1% autohyd. Y-1842 P-M
D. 30 gm. ZnO powder+30 ml. 1% autohyd. Y-2448 P-M

TABLE II
[Brookfield viscosimeter, No. 3 spindle]

| Sample | 6 r.p.m. | 12 r.p.m. | 30 r.p.m. | 60 r.p.m. |
|---|---|---|---|---|
| A | <100,000 | (1) | (1) | (1) |
| B | <100,000 | (1) | (1) | (1) |
| C | 2,520 | 1,800 | 1,400 | 872 |
| D | 2,800 | 1,840 | 940 | 560 |

[1] Too viscous to read even at lowest r.p.m.

This invention is to be clearly distinguished from that disclosed and claimed in application Serial No. 860,614, filed of even date, in which it is taught that pure mannose-6-phosphate, having utility in biochemical research, may be prepared by first hydrolyzing the same potassium phosphomannans employed as starting materials in the instant invention, then forming a precipitable salt of mannose-6-phosphate with barium acetate, and then freeing the desired substance by cation exchange.

The following embodiment further teaches the practice of my invention.

EXAMPLE 1

Phosphomannan, NRRL Y-1842, in the form of its potassium salt, was prepared by culturing 200 ml. of a freshly prepared subculture of *Hansenula capsulata*, NRRL Y-1842, for 96 hours at 25° C. under aerobic conditions (0.5 millimole $O_2$/l./min.) with 19 volumes of a substrate having the following composition:

Component: Wt. by vol., percent
Comml. glucose _____ 6.0
Corn steep liquor _____ 0.1
Tryptone _____ 0.1
$KH_2PO_4$ _____ 0.5
Solution B (Speakman salts),[1] v./v. _____ 0.5
Water, q.s.
(Initial pH, 5.0.)

[1] J. Biol. Chem. 58, 395 (1923–1924).

Phosphomannan, NRRL Y-1842, in the form of its potassium salt was recovered by supercentrifuging off the yeast cells after adding 2100 ml. methanol (providing a 50 percent concentration); adding 30 ml. of saturated potassium acetate solution to precipitate the potassium salt of said phosphomannan from the centrifugate; redissolving the potassium salt of the phosphomannan in 6000 ml. of 50-percent aqueous methanol; recentrifuging; reprecipitating the potassium salt of the phosphomannan from the supernatant by adding 40 ml. of saturated potassium acetate solution; redissolving the potassium phosphomannan in 1500 ml. distilled water; adding 900 ml. of methanol containing 5 percent potassium acetate (final methanol concentration of 37 percent); dehydrating the precipitated potassium phosphomannan, NRRL Y-1842, in 600 ml. methanol containing 1 percent potassium acetate; washing with absolute methanol; and drying in a vacuum oven for 8 hours at 45° C. Yield: 55 grams of pure white powder.

Two grams of potassium phosphomannan, NRRL Y-1842, obtained as above was dissolved in 200 ml. distilled water and slurried with an excess (until Congo red turned blue) of the hydrogen form (H+) of a sulfonic acid type cation exchange resin. The viscosity of the phosphomannan solution fell abruptly so that the cation exchange resin settled and permitted simple decantation of the solution containing the pyrophosphoric acid form of the phosphomannan. Heating of the decanted solution for 20 minutes at 100° C. provided autohydrolysis of the pyrophosphoric acid group and formation of the phosphoric acid monoester form of phosphomannan, NRRL Y-1842. The 1 percent solution thusly prepared was employed after neutralization in the zinc oxide dispersion studies evaluated in Table I, but it is obvious that for commercial purposes it might be advantageous to provide the neutralized dry product or partially evaporated solutions.

Having fully disclosed my invention, I claim:

1. A method of producing the phosphoric acid monoester of a phosphomannan polymer obtained from the aerobic whole culture fermentation of a yeast selected from the group consisting of *Hansenula holstii* NRRL Y-2448, *Hansenula holstii* NRRL Y-2154, *Hansenula holstii* NRRL Y-2155, *Hansenula capsulata* NRRL Y-1889, *Hansenula capsulata* NRRL Y-1842, *Hansenula minuta* NRRL Y-411, *Pachysolen tannophilus* NRRL Y-2461, *Torulopsis pinus* NRRL Y-2023, and *Saccharomyces pini* NRRL YB-2022, comprising slurrying said phosphomannan polymer in the form of its potassium salt with the hydrogen form of a sulfonic acid type cation exchange resin to form a solution containing the pyrophosphoric acid form of said phosphomannan polymer, separating said solution from the slurry, and heating said solution at a temperature of about 100° C. for about 20 minutes to effect autohydrolysis of the pryophosphoric acid group and formation of the phosphoric acid monoester form of said phosphomannan polymer.

2. A method of producing the phosphoric acid monoester of a phosphomannan polymer obtained from the aerobic whole culture fermentation of a yeast selected from the group consisting of *Hansenula holstii* NRRL Y-2448, *Hansenula holstii* NRRL Y-2154, *Hansenula holstii* NRRL Y-2155, *Hansenula capsulata* NRRL Y-1889, *Hansenula capsulata* NRRL Y-1842, *Hansenula minuta* NRRL Y-411, *Pachysolen tannophilus* NRRL Y-2461, *Torulopsis pinus* NRRL Y-2023, and *Saccharomyces pini* NRRL YB-2022, comprising slurrying said phosphomannan polymer in the form of its potassium salt with the hydrogen form of a sulfonic acid type cation exchange resin to form a solution containing the pyrophosphoric acid form of said phosphomannan polymer, separating said solution from the slurry, heating said solution at a temperature of about 100° C. for about 20 minutes to effect autohydrolysis of the pyrophosphoric acid group and formation of the phosphoric acid monoester form of said phosphomannan polymer, and neutralizing the resulting solution.

References Cited in the file of this patent
UNITED STATES PATENTS

| | | |
|---|---|---|
| 1,129,321 | Von-Euler-Chelpin | Feb. 23, 1915 |
| 2,023,036 | Funaoka | Dec. 10, 1935 |
| 2,052,029 | Harris | Aug. 25, 1936 |
| 2,520,980 | Terkel | Sept. 5, 1950 |
| 2,678,902 | Mehaffey | May 18, 1954 |